United States Patent [19]

Deamud et al.

[11] 3,895,171

[45] July 15, 1975

[54] METHOD OF COATING A SUBSTRATE WITH AN ELECTRON BEAM CURABLE PAINT COMPOSITION CONTAINING THERMOPLASTIC VINYL RESIN AND ARTICLE FORMED THEREFROM

[75] Inventors: James R. Deamud, Novi; Charles L. Hickson, Sterling Heights, both of Mich.

[73] Assignee: Ford Motor Company, Dearborn, Mich.

[22] Filed: July 2, 1973

[21] Appl. No.: 375,992

[52] U.S. Cl. ...... 428/461; 204/159.16; 204/159.17; 260/875; 427/44; 428/463
[51] Int. Cl.² ................B05D 3/06; C08F 265/06; C08F 267/06
[58] Field of Search .................... 117/93.31, 161 K; 204/159.15, 159.16, 159.17; 260/875, 22 CB, 22 CQ, 862, 863

[56] References Cited
UNITED STATES PATENTS

| | | | |
|---|---|---|---|
| 3,449,468 | 6/1969 | Vrotney et al. | 260/862 |
| 3,530,100 | 9/1970 | D'Alelio | 260/862 |
| 3,700,624 | 10/1972 | Adachi et al. | 260/862 |
| 3,784,005 | 1/1974 | McVay | 260/862 |

*Primary Examiner*—John H. Newsome
*Attorney, Agent, or Firm*—Roger L. May; Keith L. Zerschling

[57] ABSTRACT

An improvement in radiation polymerizable paints which comprise a film-forming binder solution of an alpha-beta olefinically unsaturated organic resin and a compound which is polymerizable with said resin comprising incorporating in said solution a saturated, thermoplastic, vinyl polymer having a molecular weight within the range of from about 10,000 to about 50,000. The process of applying and curing a film of this paint upon a substrate and the article of manufacture resulting therefrom are also parts of this invention.

12 Claims, No Drawings

METHOD OF COATING A SUBSTRATE WITH AN ELECTRON BEAM CURABLE PAINT COMPOSITION CONTAINING THERMOPLASTIC VINYL RESIN AND ARTICLE FORMED THEREFROM

BACKGROUND OF THE INVENTION

This invention relates to the art of coating and is primarily concerned with method and means for providing articles of manufacture, particularly wood, metal and shaped polymeric surfaces, with decorative and weather resistant coatings, including improved paints for such purpose, their preparation, application to a substrate and polymerization thereon by ionizing radiation. The film coatings formed from the preferred embodiments of the improved paints of this invention are applied to a substrate by conventional means, e.g., brushing, spraying, roller coating, etc., to an average thickness which is preferably in the range of from about 0.1 to about 4.0 mils depending on the substrate and the intended end use of the coated product and are cured at relatively low temperatures, e.g., between room temperature (20° to 25°C) and the temperature at which significant vaporization of their most volatile component is initiated, ordinarily between 20° and 70°C. The radiation energy is applied at dose rates of from about 0.1 to about 100 Mrad per second upon a preferably moving workpiece with the coating receiving a total dose in the range from about 0.1 to about 100, preferably from about 1 to about 25 Mrad.

In this application, the term "paint" is meant to include finely divided pigment and/or particular filler in a film-forming, resin comprising binder or the binder without pigment and/or particulate filler. Thus, the binder which is ultimately converted to a weather and wear resistant film can be all or virtually all that is used to form the film, or it can be a vehicle for pigments and/or particulate filler material.

The term "ionizing radiation" as employed herein means radiation having sufficient energy to remove an electron from a gas atom, forming an ion pair, and hence radiation with energy of, or equivalent to, about 5,000 electron volts. The preferred method of curing films of the instant paint binders upon substrates to which they have been applied is by subjecting such films to a beam of polymerization effecting electrons which is at its source of emission within the range of, or equivalent to, 100,000 to 450,000 electron volts. In this method of curing, it is preferred to employ a minimum of 25,000 electron volts per inch of distance between the radiation emitter and the workpiece where the intervening space is occupied by air. Adjustment is made for the resistance of the intervening gas which is preferably an oxygen-free inert gas such as nitrogen, helium or combustion products of natural gas. It is, however, within the scope of the invention to effect polymerization using either that which is conventionally termed "high energy particle radiation" or "ionizing electromagnetic radiation."

The abbreviation "Mrads" as employed herein means one million Rads. The term "Rads" as employed herein means that dose of radiation which results in the absorption of 100 ergs of energy per gram of absorber, e.g., coating film. The electron emitting means may be a linear electron accelerator capable of producing a direct current potential in the range herein before set forth. In such a device electrons are ordinarily emitted from a hot filament and accelerated through a uniform voltage gradient. The electron beam, which may be about one-eight inch in diameter at this point is then scanned in one direction to make a fan-shaped beam and then passed through a metal window, e.g., magnesium-thorium alloy of about 0.003 inch thickness.

The particular paint compositions to which the improvement of this invention relates are those which, on a pigment and particulate filler-free basis, consist essentially of a film-forming binder solution of an alpha-beta olefinically unsaturated organic resin and a compound polymerizable with said resin upon exposure to ionizing radiation. The alpha-beta olefinically unsaturated organic resin generally includes between about 0.5 and about 5 units of olefinic unsaturation per 1,000 units of molecular weight. In the preferred compositions to which the improvement of this invention applies the alpha-beta olefinically unsaturated organic resin includes between about 0.5 and about 3 units of olefinic unsaturation per 1,000 units of molecular weight and the compound polymerizable with said resin is a vinyl monomer or mixture of vinyl monomers.

Such radiation polymerizable paints as discussed above are represented by those disclosed in the following U.S. Pat. Nos.: 3,437,514; 3,437,512; 3,437,513; 3,528,844; 3,542,586; 3,542,587; 3,577,262; 3,577,263; 3,577,264; 3,577,265; 3,585,065; 3,586,528; 3,586,530; 3,632,399; 3,641,210; 3,642,939; 3,649,337; 3,650,811; 3,650,812; 3,650,813; 3,660,143; 3,660,144; 3,660,145 and 3,660,371. Although the compositions disclosed in each of these patents will be further discussed hereinafter, the complete disclosure of each of the patents is incorporated into this disclosure.

The film-forming binder solutions of each of the above patents is suitable to provide an external surface finish to articles of manufacture which are weather and wear resistant. These coatings, thus, may be classified as finish coatings, and, as such, are required to provide not only an excellent appearance but physical properties which will enable the coated part to withstand the elements to which it may be exposed. Among the most important physical properties for such a coating, are the degree of adhesion to the particular substrate to which it is applied and the flexibility of the coating on the substrate. While each of the coating compositions disclosed in the above patents does exhibit outstanding physical properties on a variety of substrates, it is desirable to provide even better adhesion properties for such coatings.

Thus, it is the object of this invention to modify paint composition which, on a pigment and particulate filler-free basis, consist essentially of a binder solution of an alpha-beta olefinically unsaturated organic resin and a compound polymerizable therewith upon exposure to ionizing radiation so as to improve the adhesion and flexibility of such a coating when applied to various substrates.

SUMMARY OF THE INVENTION

The subject invention is based on the discovery that desirable increased adhesion of such radiation polymerized coatings to a variety of substrates including wood, metal and polymeric surfaces can be achieved by incorporating in the paint solution between about 1 and about 15 weight percent, preferably between about 2 and about 7 weight percent, based on the total formula weight of the paint, including all additives, of a saturated, thermoplastic, vinyl polymer having a molecular weight within the range of from about 10,000 to about 50,000.

The term "vinyl polymer" as used herein refers to a polymer formed from vinyl monomers. The term "vinyl monomers" is intended to mean monomeric compounds having a

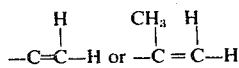

terminal group and excludes allylic compounds. Among the vinyl monomers which are preferred are the acrylic monomers and vinyl hydrocarbons. The term "acrylic monomer" is intended to mean an alpha-beta, monounsaturated, monocarboxylic acid or ester thereof. Thus, the vinyl polymers useful in the improved paint compositions of this invention may be selected from the group consisting of homopolymers of vinyl hydrocarbons, homopolymers of acrylic monomers, copolymers of vinyl hydrocarbons, copolymers of acrylic monomers, and copolymers of acrylic monomers and vinyl monomers.

Preferred among the acrylic monomers are the monofunctional monoacrylates and monoalkylacrylates. Of these, the most preferred are the esters of acrylic or methacrylic acid and $C_1$-$C_8$ monohydric alcohols, e.g., methyl methacrylate, ethyl acrylate, butyl acrylate, butyl methacrylate, hexyl acrylate, cyclohexyl methacrylate and 2-ethylhexyl acrylate. Although monofunctional acrylates are preferred, polyhydric alcohol esters of acrylic and alkylacrylic acids may also be included in the vinyl polymer. Still further acrylic monomers suitable for use in the polymers of this invention are those including non-polymerizable functionality (e.g., —COOH; —OH; —$NH_2$; etc.). Included in these monomers, but not by way of limitation, are acrylic acid, alkylacrylic acids (e.g., methacrylic acids) and acrylamide. Among the vinyl hydrocarbon monomers useful in forming the vinyl polymers useful in the invention are styrene and methyl substituted styrenes such as alpha-methyl styrene and vinyl toluene.

Of the various homopolymers and copolymers which can be formed from the above-described monomers the most preferred are polymethyl methacrylate, polystrene, and copolymers containing from about 30 to about 50 mole percent of methyl methacrylate monomer or styrene monomer and from about 70 to about 50 mole percent of other vinyl monomers, particularly other acrylic monomers such as the above enumerated acrylic or methacrylic esters of monohydric alcohols.

As discussed above, the paint or film-forming binder solution in conjunction with which the saturated, thermoplastic, vinyl polymers described above may be employed to produce the desired increase in adhesion and flexibility when applied to various substrates includes alpha-beta olefinically unsaturated organic resins containing between about 0.5 and about 5 units of unsaturation per 1,000 units of molecular weight and a second compound polymerizable therewith upon exposure to ionizing radiation, such as those taught by the above-enumerated prior art references. The variety of alpha-beta olefinically unsaturated organic resins disclosed in those patents have molecular weights which vary over a wide range of from about 370 to about 50,000. The compounds polymerizable with the alpha-beta olefinically unsaturated resins preferably are monovinyl monomers, but also may include various divinyl and tetravinyl compounds as well as a second alpha-beta olefinically unsaturated resin. Of course, the selection of the particular alpha-beta olefinically unsaturated resin and the compound polymerizable therewith will depend upon a number of factors including the type of substrate to be coated, the intended use of the end product and the desired viscosity of the binder, keeping in mind the desired mode of application.

Although varying amounts of the alpha-beta olefinically unsaturated resin and the compounds polymerizable therewith may be employed, generally the binder solution will contain, on a non-polymerizable solvent, pigment and particulate-free basis, between about 90 and about 10 parts, more commonly between about 80 and about 20 parts, of the unsaturated resin and between about 10 and about 90 parts, more commonly between about 20 and about 80 parts, of the compound polymerizable therewith. It is to this binder solution that the above-discussed saturated, thermoplastic vinyl resin is added. The amount of such resin when calculated based on the weight of the binder solution alone rather than on the total formula weight of the paint as above ranges from about 1.7 to about 26.0 weight percent, preferably from about 3.4 to about 12 weight percent based on the total formula weight of the binder solution including the thermoplastic resin. Of course, preferred amounts of various components in various solutions will be apparent from the reading of the above-noted prior art patents.

Alpha-Beta Olefinically Unsaturated Resins

The term "alpha-beta olefinically unsaturated organic resin" as used herein means an organic resin having olefinic unsaturation provided by an alpha-beta olefinically unsaturated monomer. More specifically the term means olefinic unsaturation between the two terminal carbons of a polymer side chain. The following discussion of alpha-beta olefinically unsaturated resins is presented as a summary of the various types of resins which may be employed in radiation curable paints known in the prior art and taught in the above-listed prior art patents. Of course, the particular details regarding the various prior art radiation curable compositions are more adequately described in the patent disclosures incorporated herein by reference.

U.S. Pat. No. 3,437,514 to Burlant discloses a number of preferred types of alpha-beta olefinically unsaturated resins useful in this invention, which types are generic to a number of the resins disclosed by others of the patents listed above. One of these resins is of the vinyl resin type. The term "vinyl resin" as used in this context is one which is formed from "vinyl monomers" and which includes the requisite amount of alpha-beta olefinic unsaturation. The vinyl monomers include acrylic resins and modified acrylic resins, the former meaning a resin formed exclusively of acrylic monomers and the latter meaning a resin formed from a major amount of acrylic monomers and a minor amount of non-acrylic monomers. The term "acrylic monomers" as mentioned above means an alphabeta monounsaturated monocarboxylic acid or esters thereof and includes, but not by way of limitation, acrylic acid, alkylacrylic acids, e.g., methacrylic acids, monohydric and polyhydric alcohol esters of acrylic acid and alkylacrylic acids, e.g., glycidyl methacrylate, 2-hydroxyethyl methacrylates, etc. These resins have a molecular weight in excess of about 1,000, commonly about 5,000 to about 25,000. Similar alpha-beta olefinically unsaturated vinyl monomer containing polymers are disclosed in U.S. Pat. Nos. 3,528,844; 3,542,586; 3,542,587; 3,577,265; 3,586,527; 3,586,528; 3,586,530; 3,641,210; and 3,642,939. All of these vinyl monomer containing polymers may be prepared by conventional free radical initiated copolymerization using two or more, preferably three or more, vinyl monomers at least one of which has a free or pendant functional group within its molecular structure, e.g., hydroxyethyl methacrylate. This functionality allows the polymer intermediate to then be reacted with various other monomers to provide the desired alpha-beta olefinic unsaturation.

A second type of alpha-beta olefinically unsaturated organic resin disclosed by U.S. Pat. No. 3,437,514 is a polyester having a molecular weight greater than 1,000 and preferably between about 2,000 and about 20,000. The preferred polyester is a copolymerization product of a polyhydric alcohol, and an acyclic, alpha-unsaturated alpha-beta dicarboxylic acid, and a cyclic aliphatic dicarboxylic acid. U.S. Pat. No. 3,577,262 also discloses such an alpha-beta olefinically unsaturated polyester. U.S. Pat Nos. 3,649,337 and 3,660,371 disclose related unsaturated polyester resins formed by reacting an alpha-beta olefinically unsaturated, monocarboxy terminated, polyester with an epoxy functional, graded-rubber particle.

A third type of unsaturated organic resin useful in this invention and taught by the Burlant patent is a silicon-modified organic resin comprising a polyester having incorporated therein a cyclic or acyclic siloxane which prior to reaction of incorporation has a reactive hydroxyl or hydrocarbonoxy group bonded to at least two of its silicon atoms. Such a resin can also be prepared by reacting a siloxane with a hydroxylated vinyl resin prepared by reacting vinyl monomers, at least one of which is a hydroxylated monomer. Various modifications of resins of this type are taught in U.S. Pat. Nos. 3,437,512; 3,437,513; 3,650,811; 3,650,812; 3,650,813; 3,577,264 and 3,632,399.

A fourth alpha-beta olefinically unsaturated organic resin disclosed by Burlant and useful in this invention is a urethane-modified organic polymer formed by reacting a diisocyanate monomer and an organic resin having in its molecular structure a plurality of hydrogen atoms which are labile with respect to an isocyanate group.

A final category of alpha-beta olefinically unsaturated organic resins disclosed by Burlant comprises epoxy resins having requisite amounts of unsaturation. Similar epoxy containing resins are disclosed in U.S. Pat. Nos. 3,577,263 and 3,660,145.

Still other alpha-beta olefinically unsaturated resins are taught by several of the patents enumerated above. For example, both U.S. Pat. Nos. 3,660,144 and 3,660,145 teach alpha-beta olefinically unsaturated elastomeric particles of cross-linked acrylic polymer for use in radiation curable paints and U.S. Pat. No. 3,585,065 teaches an alpha-beta olefinically unsaturated siloxane resin for use in a film-forming binder system. Of course, the subject invention is not limited to the types of unsaturated resin summarized above, but may include any alpha-beta olefinically unsaturated organic resin having the requisite unsaturation and being polymerizable upon being subjected to ionizing radiation. It should also be appreciated that the radiation polymerizable paints of this invention may also employ mixtures of the various alpha-beta olefinically unsaturated organic resins where desired for the particular application.

Compound Polymerizable With Alpha-Beta Olefinically Unsaturated Resin

The other primary binder component, the compound polymerizable by exposure to ionizing radiation with the alpha-beta olefinically unsaturated organic resin, is most preferably a vinyl monomer as defined above or a mixture of vinyl monomers. The preferred vinyl monomers taught by the above patents are esters of $C_1$–$C_8$ monohydric alcohols and acrylic or methacrylic acids, e.g., methyl methacrylate, ethyl acrylate, butyl acrylate, butyl methacrylate, octyl acrylate, 2-ethylhexyl acrylate, etc. Alcohols of higher carbon numbers, e.g., $C_9$–$C_{15}$ as well as difunctional alcohol can also be used to prepare esters or diesters. Vinyl hydrocarbon monomers, e.g., styrene and alkylated styrenes such as vinyl toluene, alpha-methylstyrene, etc., may also be used to separately or in combination with the aforementioned vinyl monomers. In combination with the acrylate monomers and/or vinyl hydrocarbon monomers, there may be used minor amounts of other vinyl monomers such as nitriles, e.g., acrylonitrile, acrylamide or n-methylol carboxylates, e.g., vinyl acetate. Such vinyl monomers are useful in combination with each of the alpha-beta olefinically unsaturated resins discussed previously and taught by the various patents.

Other vinyl containing compounds which are polymerizable with the above-discussed organic resins upon introduction of ionizing radiation, are divinyl and tetravinyl compounds such as those disclosed by U.S. Pat. Nos. 3,586,527; 3,586,528; and 3,586,530. These compounds are formed by first reacting a diepoxide or monoepoxide with acrylic acid and/or methacrylic acid and then subsequently reacting the resultant ester condensation product with a saturated acylhalide. The divinyl and tetravinyl compounds disclosed in these patents are homopolymerizable and copolymerizable with each other and with various monovinyl monomers mentioned above.

Still other compounds polymerizable with the alpha-beta olefinically unsaturated resins may be employed as the second binder component. Included in such compounds are the alpha-beta unsaturated siloxanes taught in U.S. Pat. Nos. 3,577,262 and 3,577,263 as well as the alpha-beta unsaturated diurethanes of U.S. Pat. No. 3,585,065 formed by reacting an unsaturated diisocyanate with an unsaturated polyester.

It should be appreciated that it is within the scope of this invention to employ various combinations of alpha-beta olefinically unsaturated resins and vinyl containing compounds polymerizable therewith as taught in the prior art incorporated herein and summarized above, the invention herein residing in the incorporation of the above-discussed unsaturated, thermoplastic, vinyl containing polymers. Thus, it should be understood that the following specific examples are presented by way of illustration and not by way of limitation.

EXAMPLE I

1. Preparation of alpha-beta olefinically unsaturated resin

| Material | Parts by Weight |
| --- | --- |
| (a) Methyl methacrylate | 328 |
| (b) Ethyl acrylate | 549 |
| (c) Glycidyl methacrylate | 123 |
| (d) Azobisisobutyronitrile | 10 |
| (e) Hydroquinone | 0.4 |
| (f) Tetraethylammonium bromide | 3.6 |
| (g) Methacrylic acid | 74.5 |
| (h) Xylene (solvent) | 1000 |

To a reaction vessel equipped with a stirrer, condenser, thermometer and nitrogen inlet and exit tubes is added solvent (h) which is then heated to reflux temperature (138°C). To this refluxing xylene is added a mixture of components (a), (b), (c) and (d) over a period of 2 hours. Heating is continued at 135°C for 4 hours and the reaction mixture is cooled to 90°C. Components (e), (g) and (f) are then added in that order. The temperature is then raised to 135°C and reaction continued until an acid number of less than one is obtained. Finally the xylene is removed by vacuum distillation.

2. The following materials are mixed together in the weight percentages indicated to form a radiation polymerizable coating containing thermoplastic polymer:

| Material | Weight Percent |
| --- | --- |
| Radiation curable resin from (1) | 13.2 |
| Hydroxypropyl acrylate | 10.8 |
| Hydroxyethyl acrylate | 13.0 |
| Isobutyl acrylate | 14.8 |
| 2-ethylhexyl acrylate | 7.6 |
| TiO$_2$ | 28.3 |
| SiO$_2$ (silica flattener) | 7.3 |
| Acryloid B-82 (This is a commercially available methyl methacrylate copolymer; a 40% solution of which in toluene exhibits a Brookfield Viscosity at 25°C of 400–700 centipoise; polymer exhibits a Tg of 35°C and gives an ultimate Tukon hardness of 10–11) | 5.0 |

3. A coating formulation containing the same materials and amounts thereof as in (2) above is prepared except that the Acryloid B-82 is omitted.

4. The compare the adhesion properties of the coating formulations of (2) and (3) the paints are coated on pretreated aluminum test panels 0.024 inches in thickness and following test results are obtained:

| | Reverse Impact to[2] Microcrack (Inch Pounds Passed) | |
| --- | --- | --- |
| | Fresh | Heat Aged[1] |
| Formulation from (2) (with thermoplastic) | 40 | 40 |
| Formulation from (3) (without thermoplastic) | 30 | 25 |

| | Taped Reverse Impact[2] Inch Pounds Passed | |
| --- | --- | --- |
| | Fresh | Heat Aged[1] |
| Formulation from (2) (with thermoplastic) | >60 | >60 |
| Formulation from (3) (without thermoplastic) | 25 | 25 |

| | T-Bend Forming to Microcrack (% Passed) | |
| --- | --- | --- |
| | Fresh | Heat Aged |
| Formulation from (2) (with thermoplastic) | 80 | 80 |
| Formulation from (3) (without thermoplastic) | 50 | 0 |

| | Taped T-Bend % Passed on 4" Panel[2] | |
| --- | --- | --- |
| | Fresh | Heat Aged |
| Formulation from (2) (with thermoplastic) | 90 | 90 |
| Formulation from (3) (without thermoplastic) | 0 | 0 |

1. Coated panels are heat aged at 140°F for 16 hours.
2. The Reverse Impact to Microcrack and T-Bend to Microcrack tests are recognized standard test methods for testing the adhesion of coatings to substrates. Reverse Impact to Microcrack is ASTM Test No. D-2794 and T-Bend to Microcrack is described in G. G. Sward, Paint Testing Manual, ASTM Special Technical Publication 500, American Society for Testing Materials, Philadelphia, 1972 at page 334. One of several means for further measuring adhesion to Microcrack Test and the T-Bend to Microcrack Tests is by applying a piece of cellophane tape to the deformed area and pulling it off and then measuring the highest impact for which the tape removes no coating (Taped Reverse Impact to Microcrack) and the percent coating remaining after pulling the tape from the surface (Taped T-Bend).

EXAMPLE II

A second comparison using the coating composition of Example I but with varying amounts of the thermoplastic Acryloid B-82 is run on pretreated aluminum 0.018 inches in thickness and the following results were obtained:

| % Thermoplastic | Pencil Hardness | Reverse Impact to Microcrack (in-lb passed) | | Taped Reverse Impact (in-lb passed) | |
| --- | --- | --- | --- | --- | --- |
| | | Fresh | Heat Aged | Fresh | Heat Aged |
| 0 | F | 30 | 25 | 25 | 25 |
| 1.5 | F | 40 | 30 | 40 | 40 |
| 2.5 | F | 40 | 35 | 50 | 40 |
| 4.0 | F | 40 | 35 | 50 | 40 |
| 5.0 | F | 40 | 40 | 50 | 40 |
| 8.0 | HB | 40 | 40 | 50 | 50 |
| 10.0 | 2B | 40 | 40 | 50 | 50 |

| % Thermoplastic | T-Bend Forming to Microcrack (% Passed) | | Taped T-Bend % Passed | |
| --- | --- | --- | --- | --- |
| | Fresh | Heat Aged | Fresh | Heat Aged |
| 0 | 48 | 0 | 0 | 0 |
| 1.5 | 48 | 0 | 60 | 0 |
| 2.5 | 54 | 18 | 60 | 24 |
| 4.0 | 60 | 36 | 60 | 48 |
| 5.0 | 78 | 48 | 72 | 48 |
| 8.0 | 84 | 60 | 84 | 84 |
| 10.0 | 84 | 60 | 84 | 84 |

EXAMPLE III

A radiation curable coating formulation is prepared according to Example I except that instead of the Acryloid B-82, the formulation includes 5.0 weight percent of a thermoplastic polymer prepared as follows:

To a 1 liter, 3-necked reaction flask fitted with a sealed stirrer, thermometer and condenser is added 300 ml. of water containing 1% by weight sodium polymethacrylate, 0.10 grams of monosodium phosphate in 10 grams of water as a buffer solution, and a mixture of 1.0 grams of benzoyl peroxide with 50 grams of methyl methacrylate and 50 grams of ethyl acrylate monomers. This mixture is stirred rapidly and heated in a water bath at 80°C for 1 hour to accomplish polymerization of the monomers. The solid polymer granules can be collected on a filter, thoroughly washed with water and dried. The polymer is analyzed to have a molecular weight of 28,000.

The coating formulation containing the above thermoplastic is mixed, sprayed on substrates of metal, wood and plastic and cured by electron beam irradiation.

EXAMPLE IV

A radiation curable coating formulation is prepared according to Example I except that instead of Acryloid B-82 the formulation contains 3.0 weight percent of a thermoplastic polymer prepared as follows:

The procedure for preparing the thermoplastic polymer of Example III is repeated except that ethyl acrylate is replaced with an equimolar amount of isobutyl methacrylate monomer.

The coating formulation containing the above thermoplastic is mixed, applied to substrates of wood, metal and plastic and cured by electron beam irradiation.

EXAMPLE V

A radiation curable coating formulation is prepared according to Example I except that instead of Acryloid B-82 the formulation contains 1.5 weight percent of a thermoplastic polymer prepared as follows:

The procedure for preparing the thermoplastic polymer of Example III is repeated except that the ethyl acrylate is replaced with an equimolar amount of methyl methacrylate, thus forming a methyl methacrylate homopolymer.

The coating formulation containing the above thermoplastic is mixed, applied to substrates of wood, metal and plastic and cured by electron beam irradiation.

EXAMPLE VI

A radiation curable coating formulation is prepared according to Example I except that instead of Acryloid B-82 the formulation contains 6.5 weight percent of a thermoplastic polymer prepared as follows:

The procedure for preparing the thermoplastic polymer of Example V is repeated except that 4.0 grams of benzoyl peroxide is included in the reaction product. The thermoplastic polymer produced has a molecular weight of about 12,000.

EXAMPLE VII

A radiation curable coating formulation is prepared according to Example I except that instead of Acryloid B-82 the formulation contains 8.0 weight percent of a thermoplastic polymer prepared as follows:

The procedure for preparing the thermoplastic polymer of Example IV is repeated except that the reaction mixture contains 0.3 grams of benzoyl peroxide and is heated for 2 hours. This polymer has a molecular weight of about 48,000.

EXAMPLE VIII

A radiation curable coating formulation is prepared according to Example I except that instead of Acryloid B-82 the formulation contains 10.0 weight percent of a thermoplastic polymer prepared as follows:

The procedure for preparing the thermoplastic polymer of Example III is repeated except that a temperature of 100°C is employed. This polymer has a molecular weight of about 20,000.

EXAMPLE IX

A radiation curable coating formulation is prepared according to Example I except that instead of Acryloid B-82 the formulation contains 6.5 weight percent of a thermoplastic polymer prepared as follows:

Into a 1 liter reaction vessel fitted with a sealed stirrer, thermometer, condenser and dropping funnel is introduced 300 ml. of xylene. Using an exterior heating source the temperature is increased to 125°C and to this hot xylene is added over a period of 2 hours a mixture of 100 grams of methyl methacrylate, 100 grams of ethyl acrylate and 2.0 grams of azobisisobutyronitrile. At the end of this 2-hour polymerization period the reaction mixture is cooled to 20°C and added to 1 liter of isopropanol. The precipitated polymer is filtered from the mixture, washed with cold isopropanol, washed with water and thoroughly dried in a vacuum oven. This polymer has a molecular weight of about 15,000.

The coating formulation containing the above thermoplastic is mixed, applied to substrates of wood, metal and plastic and cured by electron beam irradiation.

EXAMPLE X

A radiation curable coating formulation is prepared according to Example I except that instead of Acryloid B-82 the formulation contains 5.0 weight percent of a thermoplastic polymer prepared as follows:

The procedure for preparing the thermoplastic polymer of Example IX is repeated except that the ethylacrylate is replaced with an equimolar amount of n-butylmethacrylate.

EXAMPLE XI

A radiation curable coating formulation is prepared according to Example I except that instead of Acryloid B-82 the formulation contains 4.0 weight percent of a thermoplastic polymer prepared as follows:

The procedure for preparing the thermoplastic polymer of Example IX is repeated except that the ethyl acrylate is replaced with an equimolar amount of methyl methacrylate, thus forming a methyl methacrylate homopolymer.

EXAMPLE XII

A radiation curable coating formulation is prepared according to Example I except that instead of Acryloid B-82 the formulation contains 3.0 weight percent of a thermoplastic polymer prepared as follows:

The procedure for preparing the thermoplastic polymer of Example IX is repeated except that the ethylacrylate is replaced with an equimolar amount of n-butyl acrylate and the methyl methacrylate is replaced with an equimolar amount of isobutyl methacrylate.

EXAMPLE XIII

A radiation curable coating formulation is prepared according to Example I except that instead of Acryloid B-82 the formulation contains 5.0 weight percent of a thermoplastic polymer prepared as follows:

The procedure for preparing the thermoplastic polymer of Example XI is repeated except that 6.0 grams of azobisisobutyronitrile is employed. This polymer has a molecular weight of about 10,000.

EXAMPLE XIV

A radiation curable coating formulation is prepared according to Example I except that instead of Acryloid B-82 the formulation contains 1.0 weight percent of a thermoplastic polymer prepared as follows:

The procedure for preparing the thermoplastic polymer of Example X is repeated except that 0.5 grams of azobisisobutyronitrile is employed. This polymer has a molecular weight of 32,000.

EXAMPLE XV

A radiation curable coating formulation is prepared according to Example I except that instead of Acryloid B-82 the formulation contains 4.0 weight percent of a thermoplastic polymer prepared as follows:

The procedure for preparing the thermoplastic polymer of Example IX is repeated except that the xylene is replaced with toluene and a temperature of 110°C is employed.

EXAMPLE XVI

A radiation curable coating formulation is prepared according to Example I except that instead of Acryloid B-82 the formulation contains 9.0 weight percent of a thermoplastic polymer prepared as follows:

The procedure for preparing the thermoplastic polymer of Example IX is repeated except that 10 grams of the methyl methacrylate is replaced with methacrylic acid.

EXAMPLE XVII

A radiation curable coating formulation is prepared according to Example I except that instead of Acryloid B-82 the formulation contains 6.0 weight percent of a thermoplastic polymer prepared as follows:

The procedure for preparing the thermoplastic polymer of Example IX is repeated except that 5 grams of the methyl methacrylate is replaced with acrylic acid.

EXAMPLE XVIII

A radiation curable coating formulation is prepared according to Example I except that instead of Acryloid B-82 the formulation contains 2.5 weight percent of any of the following commercially available thermoplastic polymers:

Acryloid A-11 and Acryloid B-72 sold by Rohm & Haas Company, Elvacite 2045, Elvacite 2008 and Elvacite 2043 sold by E. I. DuPont de NeMours and Company, Inc.

EXAMPLE XIX

To 95 parts by weight of each paint dispersions prepared in accordance with Example I of U.S. Pat. No. 3,660,145 is added 5.0 parts by weight of a saturated, thermoplastic vinyl polymer prepared in accordance with the procedure set forth in Example III. The paint dispersions are applied to wood, metal and plastic substrates by spraying and cured by electron beam irradiation.

EXAMPLE XX

To 95 parts by weight of each the paint dispersions prepared in accordance with Example I of U.S. Pat. No. 3,660,145 is added 5.0 parts by weight of the saturated, thermoplastic vinyl polymer prepared in accordance with the procedure set forth in Example X.

EXAMPLE XXI a. An alpha-beta olefinically unsaturated urethane-modified organic resin is prepared from the following components:

| Material | Mole Percent | Weight Percent |
|---|---|---|
| (1) Adipic Acid | 24 | 28.0 |
| (2) Maleic anhydride | 8 | 5.6 |
| (3) Neopentylglycol | 38 | 31.1 |
| (4) Hexamethylenediisocyanate | 16 | 22.1 |
| (5) 2-hydroxyethyl acrylate | 14 | 13.2 |

Components (1), (2) and (3) are charged to a reaction vessel equipped in the usual way for a polyester synthesis (i.e., so that water can be removed during the course of the reaction) and heated gradually to 230°C. When an acid value less than 16 is obtained (average reaction time 4.5 hours), the mixture is cooled to 150°C and 0.04 weight percent hydroquinone is added. The mixture is further cooled to below 100°C and reduced to 70% solids with butyl acrylate.

Component (4) is added at room temperature, and the mixture is heated to 60°–70°C until an isocyanate level of 5% is obtained.

Component (5) is added at 70°C and the mixture is heated at 80°–100°C until the isocyanate is essentially completely reacted. The mixture is reduced to 60% with equal parts 2-hydroxyethyl acrylate and butyl acrylate.

b. Preparation of coating formulation and coated article.

| | Material | Weight Percent Coating A | Weight Percent Coating B |
|---|---|---|---|
| (1) | Resin solution from Step (a) | 65 | 45 |
| (2) | 2-ethylhexyl acrylate | 15 | 20 |
| (3) | Neopentylglycoldiacrylate | 10 | 15 |
| (4) | Thermoplastic made in accordance with procedure of Example VIII | 2.0 | 13.0 |

The components are mixed in the indicated proportions by weight, applied to a substrate and cured thereon with an electron beam in a nitrogen atmosphere at:

| | |
|---|---|
| Average Current Density | 295 Kilovolts |
| Current | 20 Milliamps |
| Total Dose | 10 Mrad |

EXAMPLE XXII

The procedure of Example XXI is repeated except that the thermoplastic resin employed is replaced by 3.5 weight percent of a thermoplastic prepared in accordance with the procedure of Example III.

EXAMPLE XXIII

To 75 parts by weight of a paint binder solution comprising an alpha-beta olefinically unsaturated polyester resin prepared in accordance with Example I of U.S. Pat. No. 3,437,514 is added 3.0 parts of the saturated, thermoplastic, vinyl polymer prepared according to the procedure of Example III. The binder solution is then mixed, sprayed on a metal substrate and cured by electron beam irradiation.

EXAMPLE XXIV

To 75 parts by weight of the silicone-modified polyester, paint binder solution prepared in accordance with Example XV of U.S. Pat. No. 3,437,514 is added 1.5 parts by weight of a saturated, thermoplastic, vinyl polymer prepared in accordance with Example XIII.

EXAMPLE XXV

To 90 parts by weight of the paint dispersions containing alpha-beta olefinically unsaturated epoxy resin and rubber-urethane-acrylate resin as prepared in accordance with Example I of U.S. Pat. No. 3,660,145 is added 3.0 parts of the saturated, thermoplastic, vinyl polymer prepared in accordance with Example X. The coatings so produced are applied by spraying onto various substrates and cured by electron beam irradiation.

It will be understood by those skilled in the art that modification can be made within the foregoing examples and within the scope of the invention as hereinbefore described and hereafter claimed.

We claim:

1. In a method of providing a substrate with an adherent coating of a paint which, exclusive of non-polymerizable solvents, pigments and particulate mineral filler consists essentially of a film-forming binder solution of vinyl monomers and an alpha-beta olefinically unsaturated organic resin containing between about 0.5 and about 5 units of olefinic unsaturation per 1,000 units of molecular weight, said vinyl monomers being a solvent for said resin and being polymerizable with said resin upon exposure to ionizing radiation, wherein said paint is applied to said substrate and the components of said binder solution cross-linked by ionizing radiation, the improvement comprising including in said paint from about 2 to about 7 weight percent based on the total formula weight of the paint of a saturated, thermoplastic, vinyl polymer selected from the group consisting of homopolymers and copolymers of vinyl hydrocarbon monomers and acrylic monomers and having a molecular weight within the range of from about 10,000 to about 50,000.

2. The method in accordance with claim 1, wherein said thermoplastic polymer is a copolymer containing between about 30 and about 50 mole percent of methyl methacrylate monomers and between about 70 and about 50 mole percent of other vinyl monomers.

3. A method in accordance with claim 1 wherein said thermoplastic, vinyl polymer is polymethylmethacrylate.

4. A method in accordance with claim 1 wherein said thermoplastic, vinyl polymer contains 50 mole percent of methylmethacrylate monomers and 50 mole percent of an acrylic acid ester selected from the group consisting of methyl acrylate, ethyl acrylate, butyl acrylate, methyl methacrylate, ethyl methacrylate, butyl methacrylate, 2-ethyl hexyl acrylate, isobutyl methacrylate, isobutyl acrylate and mixtures thereof.

5. A method in accordance with claim 1 wherein said thermoplastic, vinyl polymer is a copolymer containing between about 30 and about 50 mole percent styrene and between about 70 and about 50 mole percent of other vinyl monomers.

6. A method in accordance with claim 1 wherein said substrate is metal.

7. In an article of manufacture comprising a substrate and an adherent coating of paint on an external surface thereof, said paint, on a pigmet and particulate filler-free basis consisting essentially of the in situ formed polymerization product of a film-forming solution of vinyl monomers and an alpha-beta olefinically unsaturated organic resin containing between about 0.5 and about 5 units of olefinic unsaturation per 1,000 units of molecular weight, said vinyl monomers being a solvent for said resin and being polymerizable with said resin upon exposure to ionizing radiation, the improvement comprising including in said paint from about 2 to about 7 weight percent based on the total formula weight of the paint of a saturated, thermoplastic, vinyl polymer selected from the group consisting of homopolymers and copolymers of vinyl hydrocarbon monomers and acrylic monomers and having a molecular weight within the range of from about 10,000 to about 50,000.

8. The article in accordance with claim 7, wherein said substrate is metal.

9. An article in accordance with claim 7, wherein said thermoplastic vinyl polymer is polymethyl methacrylate.

10. An article in accordance with claim 7, wherein said thermoplastic vinyl polymer is a copolymer containing from about 30 to about 50 mole percent of methyl methacrylate monomers and from about 70 to about 50 mole percent of other vinyl monomers.

11. An article in accordance with claim 10, wherein said copolymer contains about 50 mole percent of polymethyl methacrylate and about 50 mole percent of an acrylic acid ester monomer.

12. An article in accordance with claim 7, wherein said thermoplastic polymer is a copolymer containing between about 30 and about 50 mole percent of styrene, and between about 70 and about 50 mole percent of other vinyl monomers.

* * * * *